United States Patent
Kocherscheidt et al.

(10) Patent No.: US 6,477,466 B1
(45) Date of Patent: Nov. 5, 2002

(54) DEVICE FOR ADJUSTING THE HEIGHT POSITIONING OF THE BODY OF A VEHICLE

(75) Inventors: Hans Kocherscheidt, Munich; Richard Eiletz, Unterhaching, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/787,013

(22) PCT Filed: Aug. 19, 1999

(86) PCT No.: PCT/EP99/06065

§ 371 (c)(1),
(2), (4) Date: Mar. 12, 2001

(87) PCT Pub. No.: WO00/15452

PCT Pub. Date: Mar. 23, 2000

(30) Foreign Application Priority Data

Sep. 11, 1998 (DE) .......................................... 198 41 751

(51) Int. Cl.$^7$ ............................ G06F 17/10; B06G 23/00
(52) U.S. Cl. ............................ 701/301; 701/36; 701/37; 701/38; 701/48; 280/5.5; 280/5.517; 280/5.518
(58) Field of Search ............................ 701/301, 36, 37, 701/1, 38, 45, 48, 300, 302; 280/5.5, 5.501, 5.502, 5.507, 5.514, 5.517, 5.518

(56) References Cited

U.S. PATENT DOCUMENTS 5,831,717 A * 11/1998 Ikebuchi ..................... 180/169
6,018,308 A * 1/2000 Shirai ......................... 342/118

FOREIGN PATENT DOCUMENTS

| DE | 42 34 523 A1 | 10/1992 |
| JP | 03193519 A | 8/1991 |
| JP | 03275313 A | 12/1991 |
| JP | 04046814 A | 2/1992 |
| JP | 05104925 A | 4/1993 |
| JP | 05305808 A | 11/1993 |
| JP | 11170838 A | 6/1999 |

* cited by examiner

Primary Examiner—Jacques H. Louis-Jacques
(74) Attorney, Agent, or Firm—Crowell & Moring LLP

(57) ABSTRACT

A method and apparatus for controlling the elevation of a vehicle body in the event of a collision includes devices for sensing information concerning objects approaching the vehicle. Sensed information may include, for example, the relative speed, distance and contour of the approaching object. Based on this information, a control unit determines whether a collision is likely. If so, the point of impact, as well as an optimal vehicle height for the collision are determined based on the sensed information, such that the impact between the object and the vehicle occurs in a portion of the vehicle which has greater reinforcement.

8 Claims, 2 Drawing Sheets

DEVICE FOR ADJUSTING THE HEIGHT POSITIONING OF THE BODY OF A VEHICLE

BACKGROUND AND SUMMARY OF THE INVENTION

This application claims the priority of German patent document 198 41 751, filed Sep. 11, 1998 and PCT International Application No. PCT/EP99/06065, filed Aug. 19 1999, the disclosures of which are expressly incorporated by reference herein.

The invention relates to a device for adjusting the height positioning of the body of a vehicle.

As a rule, vehicles are nowadays constructed to offer the highest possible passive safety in the event of collisions. For this purpose, measures have been implemented in all parts of the vehicle to strengthen it and to absorb the highest possible kinetic energy in the event of a collision.

However, as a result of differences in size and height, vehicles often experience an underride or impact of foreign objects or other vehicles onto a portion of the vehicle structure which is less reinforced than other parts. For example, in a frontal collision with a truck, a passenger car front hood will impact on the truck bumper. Also when driving into parking spaces, the levels of bumpers often do not match. During side collisions, impact usually occurs not in the particularly stable side member region, but in a region situated above it.

Japanese Patent Document JP-A-04046814 discloses a level adjusting device for a vehicle which is intended to reduce a risk of injury to pedestrians in the event of a collision. For this purpose, a detection device detects whether a collision with a pedestrian is imminent. If so, the level of the vehicle is lowered on the collision side or on the front side in order to reduce the power of the impact. However, this system is not suitable for increasing passive safety in a motor vehicle that collides with another hard object.

One object of the invention is to provide a level control system by which, in the event of a collision, assures that the impact occurs on a well reinforced region of the vehicle.

This and other objects and advantages are achieved by the vehicle elevation control system according to the invention, in which a detection device generates data of an object approaching the vehicle. These data may be, for example, the relative speed, the distance or the contour of an approaching object. The detection device can also evaluate data from a Global Positioning System (GPS), telemetry data or other external data for determining the relative approaching of another vehicle.

A processing device is constructed such that it can reliably determine an imminent collision from the data supplied by the detection device. For this purpose, an algorithm must be selected which, if possible, avoids a faulty triggering. It is advantageous, for example, to carry out the securing measure of a corresponding vehicle level adjustment only when a collision of a certain intensity is to be expected. If the processing device has determined a probable collision and has located the point of impact, it will calculate an optimal vehicle height for the imminent collision, based on the data supplied by the detection device. The vehicle height is calculated such that the collision occurs in a region of a vehicle part with a particularly high passive safety. If the vehicle is to be secured all around, at least four detection devices are required for this purpose, specifically in the front and rear region as well as in the two side regions.

The signal emitted on the basis of the calculation by the processing device is conducted to actuators which carry out a vehicle level adjustment corresponding to the calculation.

In order to carry out a sufficiently rapid level change, it is advantageous to provide an energy accumulator from which the actuators can obtain energy. Preferably, for example, in the case of a side collision, a level change is endeavored in the range of 0.5 seconds; that is, at a level changing speed of 0.3 m per second. In this case, it is not necessary to move the entire vehicle to the calculated level. It is sufficient to correspondingly move only the vehicle side facing a possible collision.

Other objects, advantages and novel features of the present invention will become apparent from the following detailed description of the invention when considered in conjunction with the accompanying drawings.

DETAILED DESCRIPTION OF THE DRAWINGS

Figure 1:
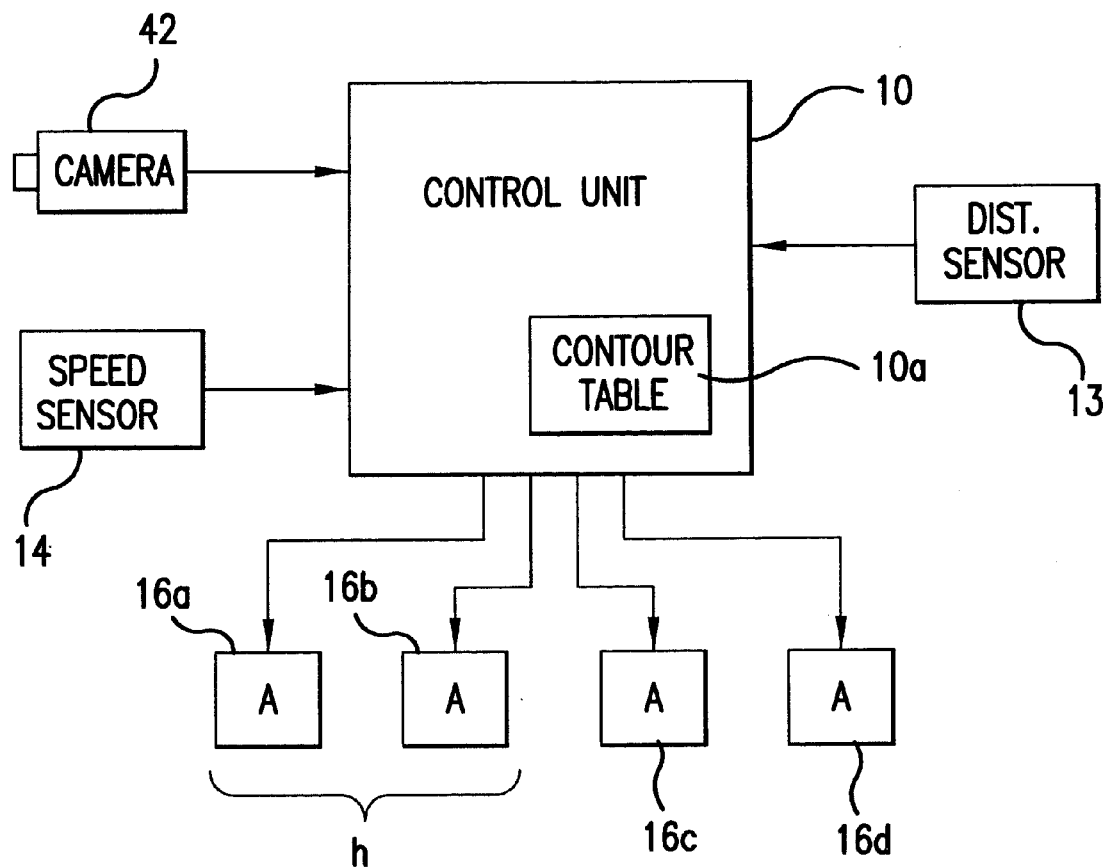
FIG. 1 is a schematic diagram of an embodiment of a level control system according to the invention.

The level control system of FIG. 1 represents a particularly simple embodiment of the invention, in which a control unit 10 receives signals from detecting devices, including an image producing device (camera 12), a distance sensor 13 and a speed sensor 14. (For all-around monitoring of the vehicle, of course, corresponding devices should be provided in each direction—front, rear, both sides).

From the received data, the control unit 10 calculates a possible collision. If such a collision is determined, it also determines the area of impact and, in this region, the required vehicle height. For this purpose, it is advantageous for the camera 12 to produce a contour of the approaching object. The level at which a first contact is to be expected can be read in a known manner from a contour table 10a. Based on this information, the control unit generates a signal which it transmits to affected actuators A (16a to 16d). In the present case, the actuators 16a and 16b were selected as affected actuators which adjust a vehicle height h'. The actuators 16c and 16d are not additionally acted upon.

Figure 2:
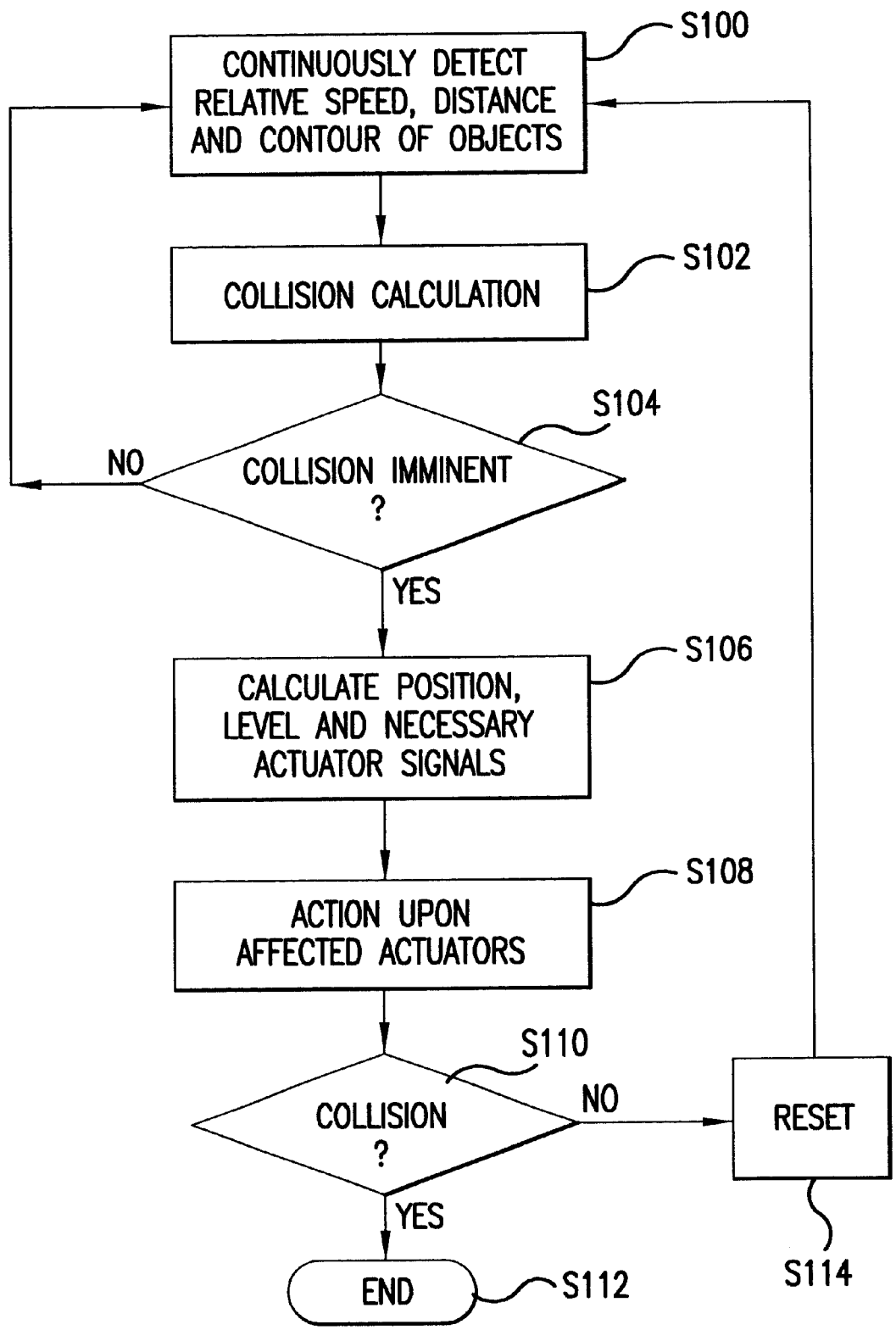
FIG. 2 is a flow chart that illustrates a process for operating the level control system of FIG. 1.

The flow chart in FIG. 2 illustrates a possible algorithm for the control device according to the invention. In a first step, the relative speed, the distance and the contour of objects situated around the own vehicle are continuously determined (S100). A collision calculation is then carried out in a step S102.

In step 104, it is decided whether a collision will take place. If not, the process returns to step S100. If a collision with take place with a predefined reliability, both the region in which it will occur and the required vehicle height are calculated. Based on this result, actuator signals are generated (step S106) which, in step S108, are transmitted to the affected actuators.

After a defined time, it is checked whether a collision has taken place (step S110). If not, a reset is carried out in step S114, and the process returns to step S100. If a collision of a defined extent has taken place, the algorithm will be terminated.

The present invention ensures in a simple manner an optimal utilization of the passive safety of a vehicle and can help reduce the vehicle damage and minimize the risk of injury to vehicle occupants. The level control system according to the invention can also be used for driving into parking spaces in order to avoid vehicle damage.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A level control system for adjusting elevation of a vehicle body to ensure in case of a collision, an impact in a well reinforced region of the vehicle, said level control system comprising:

a detection device for generating data of an object approaching the vehicle;

an electronic processing device; and actuators for adjusting the vehicle body level; wherein the processing device determines at least from said data a likelihood of a possible collision, as well as a probable point of impact and level of impact; and said control unit emits signals to the actuators to adjust the elevation of the vehicle body in the collision area to a height such that an impact occurs at a desired optimal collision point.

2. The level control system according to claim 1, wherein the detection device comprises at least one of a sensor system and a picture producing device which supply signals indicative of at least one of relative speed, distance and contour of an approaching object.

3. The level control system according to claim 2, wherein said defined time is 0.5 seconds.

4. The level control system according to claim 1, further comprising an energy accumulator which supplies energy to the actuators to bring the vehicle to the desired level within a defined time.

5. The level control system according to claim 1, wherein the processing device causes adjustment of the vehicle body elevation only on a collision side of the vehicle.

6. A process for controlling elevation of a vehicle body of a vehicle having areas of greater reinforcement and areas of lesser reinforcement; said process comprising:

sensing information concerning objects which approach said vehicle;

based on sensed information, determining likelihood of a collision of said object and said vehicle;

upon determination of an imminent collision, based on said sensed information determining a probable point of impact and level of impact; and based on said determined point and level of impact, adjusting elevation of said vehicle body to a height such that said impact occurs in an area of said vehicle body having greater reinforcement.

7. A process according to claim 6, wherein said sensed information comprises at least one of relative speed, distance and contour of an approaching object.

8. The process according to claim 6, wherein said adjustment of elevation of the vehicle body is performed only on a side of the vehicle at which said impact is to occur.

* * * * *